United States Patent [19]

Nelms

[11] 4,429,749

[45] Feb. 7, 1984

[54] FARRIER'S EQUINE HOOF-SIZER

[75] Inventor: Robert L. Nelms, Sparks, Nev.

[73] Assignee: Allfarr Enterprises, Inc., Dallas, Tex.

[21] Appl. No.: 403,490

[22] Filed: Jul. 30, 1982

[51] Int. Cl.³ .......................... A01L 7/00; A01L 11/00
[52] U.S. Cl. ......................................... 168/45; 168/7;
   33/195
[58] Field of Search .......................... 168/4, 6, 7, 8, 19,
   168/45, 47; 33/195

[56] References Cited

U.S. PATENT DOCUMENTS

| | | | |
|---|---|---|---|
| 361,635 | 4/1887 | Kress | 168/19 |
| 519,453 | 5/1894 | Hogbin | 168/19 |
| 612,200 | 10/1898 | Gray | 168/7 |
| 735,288 | 8/1903 | Northern | 168/45 |

*Primary Examiner*—Robert P. Swiatak
*Attorney, Agent, or Firm*—J. Gibson Semmes

[57] ABSTRACT

A farrier's equine hoof-sizer characterized by its adaptation to an equine's individual hooves for purposes of sizing in shoeing. The sizer is extensible to a straight line for portability. It is lightweight, durable and of such construction that in the sizing of hooves of various lateral configuration, the measurement may be sustained in semi-rigidity for comparative guidance in the farrier's shaping of the shoe. It is adaptable to either cold or hot shoeing.

3 Claims, 3 Drawing Figures

FARRIER'S EQUINE HOOF-SIZER

BACKGROUND OF THE INVENTION

Description of the Prior Art

The prior art is represented by numerous modes of measurement of the equine's hooves, precedent to shoeing, the purpose being to eliminate guesswork and/or trips to and from a given hoof to the anvil and return while developing a shoe. This art was earliest represented by Murray U.S. Pat. No. 789,100, dated May 2, 1905, by W. McIntosh U.S. Pat. No. 839,181, dated Dec. 25, 1906 and by the Patent to A. M. Yates, U.S. Pat. No. 1,202,348, dated Oct. 24, 1916. Of similar characteristics are adjustable horseshoes, represented by P. Harsem, U.S. Pat. No. 1,861,695, dated June 7, 1932 and L. Bucalo U.S. Pat. No. 3,913,679, dated Oct. 21, 1975.

In none of the art however, does one find a satisfactory, readily portable hoof-sizer adapted to infinite irregularities in the hooves of horses which are to be shod. In the art of farriery, it is known that no two hooves are the same. On a given horse, various irregularities to the pared hooves develop and change from the time of foaling to demise. These irregularities cause the conscientious farrier concern, as it is very difficult to develop the shoe without an excessive number of trips back and forth, with shoe in hand, from the pared hoof to the anvil, whereby a given shoe may be shaped.

SUMMARY OF THE INVENTION

This is a farrier's tool wherein the dimensions of a given hoof of a horse may be transferred to the tool by application of the tool to the pared hoof and wherein, sequentially, the tool is then taken to the shoe and the selected shoe shaped on the anvil to the configuration and size of the tool, which in effect, simulates the imprint of the horse's hoof once it has been pared. In earlier practice, the farrier must make from two to five trips between anvil and the animal to obtain an accurate fit for given hoof. Thus, the invention not only relieves the time factor, but also fatigue of the farrier.

In practice, when this tool is used, it results in at least a saving of a quarter of an hour in the process of shoeing a horse. The extensible conforming hoof-sizer tool is developed in interconnected sections or links as in a chain linkage, the links being tensioned together whereby the selected curvature, corresponding to the imprint of a given horses hoof may be sustained until purposely disturbed.

In practice, after the hoof-sizer has been shaped to the size of the hoof and taken by the farrier to the anvil, the new, unshaped shoe is laid on the bottom of the sizer to determine the appropriate bend which must be applied to the sizer. The shoe, whether cold or hot, is then shaped on the anvil to conform to the inside edge of clips which are on the tool, without requiring return during the sizing and shaping of the shoe. The farrier may thus develop and shape the shoe without returning time and again to the animal, to lift its hoof, to try to obtain the necessary fit without assistance such as by the utility of the present tool. The fitting of shoes is thus far less troublesome and the accuracy of the configuration of the shoe fitted through the use of this hoof-sizer is such as to make it much less likely for the farrier to nail into the quick of a hoof and lame the animal.

By virtue of the tension between elements comprising the hoof-sizer, it is unaffected by dirt, water or oil such as almost always is present in stabling areas where the shoeing takes place.

Having briefly summarized the invention, reference is made to the following drawings.

DESCRIPTION OF THE PREFERRED EMBODIMENTS

Figure 1:
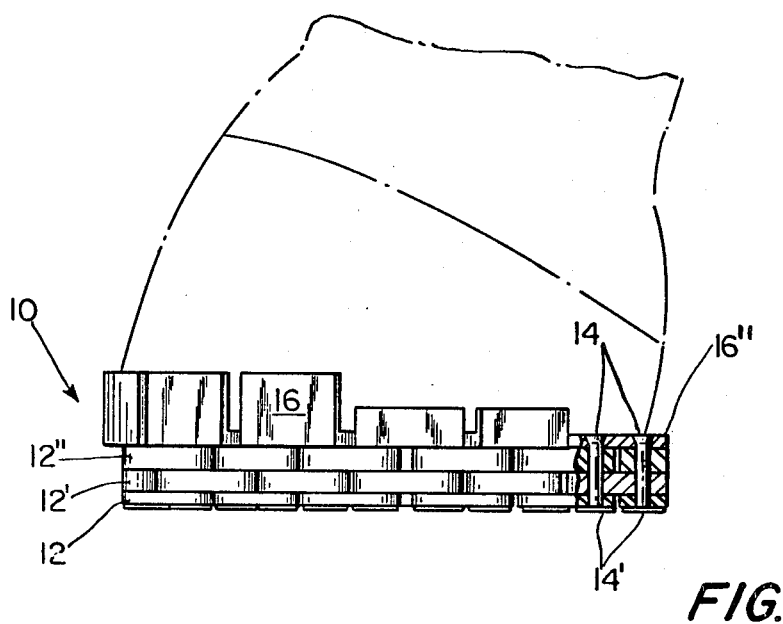
FIG. 1 is a view of the invention in side elevation, as is applied to the hoof of a horse in the first step of sizing.
Figure 2:
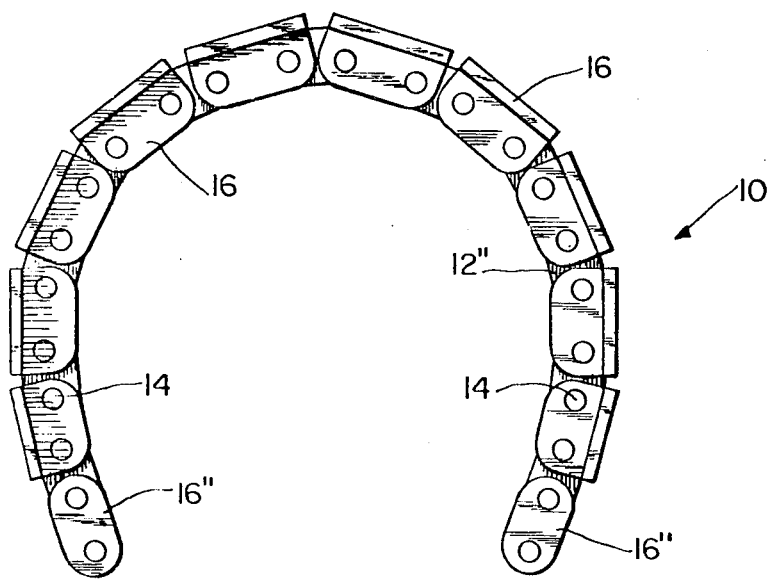
FIG. 2 is a top plan view of the invention showing that portion which contacts the hoof of the horse and to which the sizer conforms.

The equine hoof-sizer 10 is articulably secured together by stacked link sections. As the instrument is extended to its full length, without any curvature, the bottom most links 22 are stacked together with the intermediate links 12' and top links 12", the respective links being in overlapping relationship as will appear from reference to FIG. 1. The links are held in pivotal relationship to the clips 16–16" by malleable and bright rivets 14. Preferably, the rivets, preferably copper No. 8, are bradded in tapered holes of the clips which are of enlarged vertical cross-section, thus, providing in the assemblage of links and clips a friction fit, relative to each other. The clips may be made of mild steel or aluminum, whereas it has been found most desirable to form the links of a polycarbonate solid plastic material. It will be noted that the rear most clips 16 have shorter upright flanges than do the intermediate clips 16, comprising six in number. Likewise, at the ends of the device, in lieu of clips, an extra flat section of links 16" is provided for reasons which will be explained hereinafter. The bottommost link sections may be made of mild steel one inch long, half inch wide and one eighth inch thick. The polycarbonate link sections which are intermediate the bottom and top are three sixteenths of an inch thick and have the same dimensions as the bottom sections, aforesaid. Whereas copper washers may be placed between respective links to facilitate bending to shape, they are not required. Clips 16 and 16" are respectively made of aluminum or mild steel; the intermediate clips having a fitting surface of one inch and a flange of three quarters of an inch, the overall being an eighth of an inch thick. The rearmost clips 16 are of the same dimension except that the flanges are of lesser vertical dimension.

Figure 3:
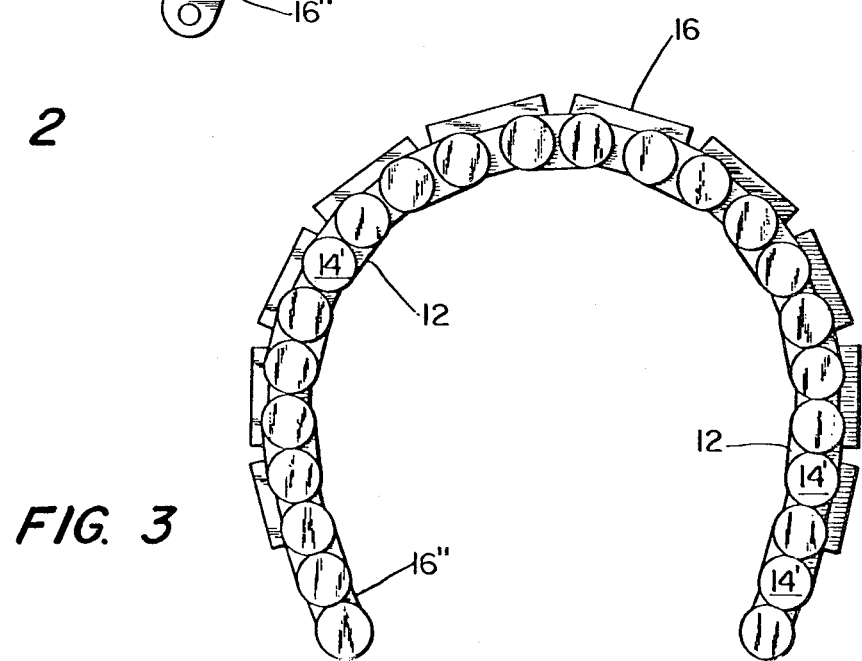
FIG. 3 is a bottom view of the invention showing FIGS. 1 and 2 aforesaid.

To provide the swivel effect for the rivets, and to lend semi-rigidity, the following details of construction are required. The rivet holes passing through the clips 16 and associated articulating link sections are tapered from the top in enlarged vertical cross-section, through the one half the depth of the horizontal flange of the clips so that upon securing the rivets, there is a friction-like fit between the respective link elements as will be apparent. The head 14' of each rivet is enlarged and flat, reference FIG. 3. When the shoe has been shaped correctly, its outer configuration will match a continuous arcuate line drawn from outside point to outside point of the rivet faces 14'. This forms, in effect, a tangential arc.

In practice the flexible sizer is applied, clips up, to the pared hoof of the equine, whence it is bent into shape. Its semi-rigid characteristic holds the shape and it is then taken by the farrier to a new iron shoe of preselected general size. The new shoe is placed upon the side opposite the clips 16, against the flat rivet heads 14'. The rivet heads appearing outside the shoe will signal that the shoe be enlarged at that point and vice-versa. When the shoe is correctly shaped, its outer rim will conform precisely point for point, to the exterior of the respective heads of the rivets against which the shoe has been applied.

I claim:

1. An equine hoof-sizer useful in farriery, comprising:
   (A) plural overlapping links joined end-to-end to form three layers of links and thereby an articulable base;
   (B) clips moveably overlying the base formed by the layers of links, said clips each having an upright hoof wall engaging clamp;
   (C) fasteners joining the links and clips in a friction-fit, whereby upon conforming the hoof sizer clips to an equine hoof, the shape thereof may be retained until completion of a given equine shoeing.

2. The hoof-sizer of claim 1 wherein corresponding links and clips define aligned fastener cavities at least a portion of the uppermost clips each defining at least one cavity which is of tapering enlarged vertical cross-section, which upon forceful securing of each fastener therein, tends to bind the fastener frictionally to the links and clips.

3. The hoof-sizer of claim 2, wherein the fasteners comprise malleable rivets, the bottoms of which correspond in alignment with the clips.

* * * * *